March 27, 1945.    L. H. DIERKING    2,372,368
PLANER GAUGE
Filed Dec. 4, 1943
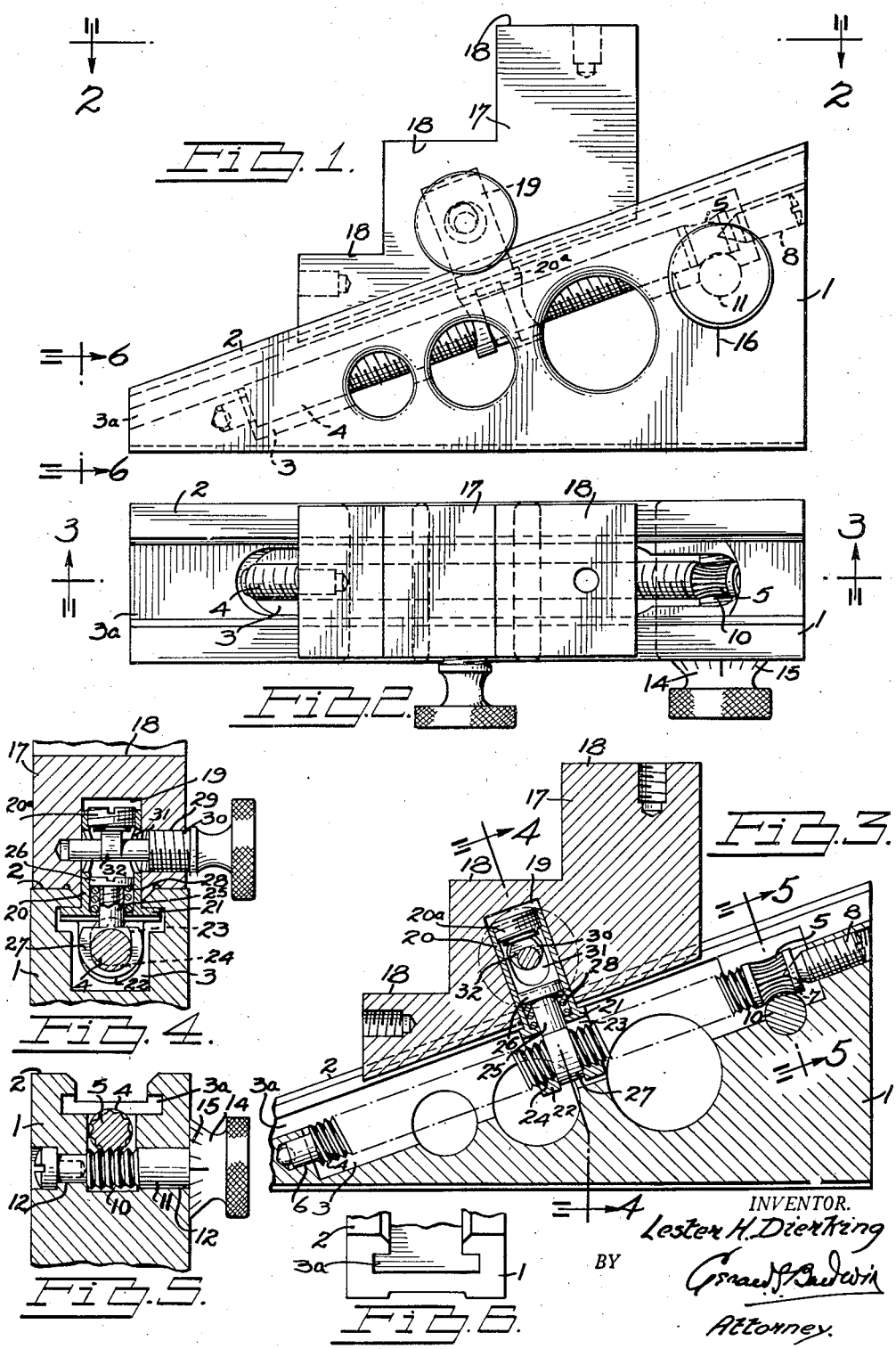
INVENTOR.
Lester H. Dierking
BY
Gerard F. Baldwin
Attorney.

Patented Mar. 27, 1945

2,372,368

UNITED STATES PATENT OFFICE 2,372,368

PLANER GAUGE

Lester H. Dierking, Detroit, Mich., assignor to Edward H. Kramer, Detroit, Mich.

Application December 4, 1943, Serial No. 512,981

7 Claims. (Cl. 33—162)

This invention relates to improvements in planer gauges, and aims, among other things, to provide a gauge including means for accurately adjusting a block longitudinally along an inclined face of a body so that exact setting of the block at any desired height may be readily obtained.

Another object of the invention is to provide a planer gauge wherein means are carried by the block either for engaging a feed screw so that the block may be longitudinally adjusted along the body by rotation of the feed screw, or for permitting movement of the block along the body independently of the said feed screw, or for locking the block and holding it immovable on the inclined face of the body.

A further object of the invention is to provide such a planer gauge which is relatively cheap and simple to manufacture and efficient in operation.

Having thus briefly stated some of the objects and advantages of the invention I will now proceed to describe a preferred embodiment thereof with the aid of the accompanying drawing, in which:

Figure 1 illustrates a side view thereof, and

Figure 2 is a plan view.

Figure 3 is a section on the line 3—3 of Figure 2.

Figures 4 and 5 are sections on the lines 4—4 and 5—5 respectively of Figure 3.

Figure 6 is an end view on the line 6—6 of Figure 1.

Referring to the drawing, I designates a body having an inclined upper side 2 which is longitudinally slotted at 3 intermediately of its ends to receive a feed screw 4 the axis of which is parallel with the inclined side 2, and formed in and extending from the lower end of the inclined side is a relatively shallow T-slot 3a. The feed screw 4 is suitably supported for rotation and has a worm wheel 5 thereon at one extremity. In the present instance one end of the feed screw is rotatably supported in a bearing 6 formed in the body 1 and its opposite end is axially countersunk at 7 to receive one extremity of a set screw 8 which is threaded through one end of the body. Extending transversely beneath the screw 4 and in engagement with the worm wheel 5 is a worm 10 which in the present instance is formed on a spindle 11 which is supported in aligned bearings 12 formed in opposite sides of the body 1. Fixed on one extremity of the spindle 11 is a circular dial 14 having radial indicating marks 15 thereon to register with an index mark 16 on the adjacent side of the body.

Mounted for sliding movement along the inclined upper side 2 of the body is a block 17 having stepped horizontal bearing faces 18 thereon. Formed in the underside of the block is an upwardly inclined chamber 19 extending at right angles to the axis of the feed screw 4. Mounted for axial movement in the chamber 19 is a sleeve 20 closed at its upper extremity as by a screw 20a and terminating at its lower end in a flange 21 the upper face of which is adapted to engage the T-slot 3a. Projecting downwardly from the flange 21 are two spaced, parallel guides 22 extending at right angles to the axis of the feed screw 4 and having vertically elongated slots 23 formed therethrough through which the said screw 4 extends. Formed in the lower portion of the bore of the guide slots 23 are partial threads 24 to engage the thread of the feed screw 4. Axially movable through an opening in the flange 21 is a plunger 25 which is coaxial with the sleeve 20 and terminates at its upper end in an enlarged head 26 which is a sliding fit in the said sleeve. Integral with the lower extremity of the plunger 25 beneath the flange 21 is a slide 27 which is slidable in contact with the adjacent faces of the guides 22. Formed through the slide is a vertically elongated aperture through which the feed screw passes. 28 denotes a helical spring arranged around the plunger 25 which extends between the top of the flange 21 and the plunger head 26 tending to force the latter upward in the sleeve 20 and raise the slide 27 so that the underside of the slot formed therethrough, which is smooth, bears against the underside of the feed screw 4. Moreover as the spring 28 bears on the top of the flange 21 it tends to force the latter downward out of engagement with the T-slot 3a and also to force the guides 22 downward so that the partial threads 24 remain disengaged from the feed screw 4.

Formed through the block 17 is a threaded aperture 29 which receives a screw 30. This screw extends through a slot 31 formed in one side of the sleeve 20 and upon its inner extremity is a cam 32 which contacts the underside of the screw 20a and raises the sleeve 20 against the downward pressure of the spring 28 acting upon the top of the flange 21.

When the screw 30 is so turned that the sleeve 20 is raised to its top position the underside of the flange 21 bears against the T-slot 3a and holds the block 17 immovable on the body 1. When the screw is turned slightly to permit a little downward movement of the sleeve 20 the flange 21 is no longer in such frictional engagement with the T-slot as to prohibit movement of the block though the partial threads 24 are still in engagement with feed screw 4 so that rotation of the latter causes movement of the block along the inclined side 2. When the cam 32 is turned to its bottom position the spring 28 depresses the sleeve 20 and its guide 22 so that the partial threads 24 are disengaged from the feed screw 4. Then the block 17 may be freely moved longitudinally of the body for rapid, approximate setting.

From the foregoing it will be readily seen that I have devised a simple and effective plunger gauge wherein the block 17 may be accurately adjusted through rotation of the feed screw 4, and by adjustment of a single screw 30 the block may be either locked in position, set for movement through rotation of the feed screw, or permitted independent movement along the inclined side 2 of the body.

While in the foregoing the preferred embodiment of the invention has been described and shown, it is understood that alterations and modifications may be made thereto provided they fall within the scope of the appended claims.

What I claim is:

1. A planer gauge including a body having an inclined side and a T-slot formed therein, a feed screw mounted for rotation in the body having its axis parallel with said inclined side, means for rotating the screw, a block mounted for movement along the inclined side having at least one horizontal face thereon, said block having a chamber formed in its underside, a member mounted for axial movement in said chamber having downwardly projecting guides, the latter having partial threads formed thereon to engage the feed screw, a flange on the member for engaging the T-slot, means for adjusting the position of the member in the chamber whereby the partial threads may be held in engagement with the feed screw to move the member or block by rotation of the screw, or whereby the flange is held in binding engagement with the T-slot to retain the block immovable and the partial threads are in binding engagement with said feed screw.

2. A planer gauge including a body having an inclined side, a feed screw mounted for rotation in the body having its axis parallel with said inclined side, means for turning the screw, a block mounted for movement along the inclined side having at least one horizontal face thereon, said block having a chamber formed in its underside, a sleeve mounted for axial movement therein, downwardly projecting guides on said sleeve having partial threads formed thereon, a plunger movable in the sleeve, means limiting the upward movement of the plunger, a spring around the plunger tending to move the sleeve downwardly whereby the partial threads are disengaged from the feed screw to permit independent movement of the block along the body, and means adapted to move the sleeve against the tension of the spring whereby the partial threads are brought into engagement with the feed screw.

3. A planer gauge including a body having an inclined side and a T-slot formed therein, a feed screw mounted for rotation in the body having its axis parallel with the inclined side, means for turning the screw, a block mounted for movement along the inclined side having at least one horizontal face thereon, said block having a chamber formed in its underside, a sleeve mounted for axial movement therein, a flange carried by the sleeve for engaging the T-slot, downwardly projecting guides on the sleeve having elongated slots therethrough on the walls of which partial threads are formed to engage the feed screw, a plunger movable in the sleeve, means limiting the upward movement of the plunger, a spring around the plunger tending to move the sleeve downwardly and disengage the partial threads from the feed screw, and means for moving the sleeve and bringing the partial threads into engagement with the feed screw and for moving the said sleeve farther whereby the flange is brought into engagement with the T-slot.

4. The combination set forth in claim 2 wherein the means for moving the sleeve includes a screw in threaded engagement with the block and extending through the sleeve, the latter having its upper extremity closed, and a cam on the screw adapted to raise the sleeve against the tension of the spring.

5. The combination set forth in claim 2 wherein a slide integral with the plunger extends downwardly therefrom and is slotted for the passage of the feed screw therethrough, the opposite sides of the slide forming bearing faces for the adjacent sides of the guides.

6. A planer gauge including a body having an inclined side, a feed screw mounted for rotation in the body having its axis parallel with said inclined side, means for rotating the screw, a block mounted for sliding movement along the inclined side having at least one horizontal face thereon, said block having a chamber formed in its underside, a member mounted for axial movement in the chamber having downwardly projecting guides, the latter being apertured to encircle the feed screw and having partial threads formed therein, means for moving said member in said chamber whereby the partial threads may be brought into engagement with said feed screw, and means carried by said member for frictionally engaging said body and holding the block immovable thereon when said member is moved to its limit of travel in one direction.

7. The combination set forth in claim 6, including spring means tending to hold said member and guides whereby the partial threads are disengaged from the feed screw and independent movement of the block along the body is permitted.

LESTER H. DIERKING.